United States Patent
Baker et al.

(10) Patent No.: US 12,275,192 B2
(45) Date of Patent: Apr. 15, 2025

(54) ADDITIVE MANUFACTURING WITH ADJUSTED COOLING RESPONSIVE TO THERMAL CHARACTERISTIC OF WORKPIECE

(71) Applicant: The Boeing Company, Chicago, IL (US)

(72) Inventors: Andrew H. Baker, St. Louis, MO (US); James B. Castle, Rolla, MO (US); Eric Erwin Thomas, Saint Charles, MO (US); Samuel Joseph Easley, Saint Peters, MO (US)

(73) Assignee: The Boeing Company, Arlington, VA (US)

( * ) Notice: Subject to any disclaimer, the term of this patent is extended or adjusted under 35 U.S.C. 154(b) by 812 days.

(21) Appl. No.: 16/421,303

(22) Filed: May 23, 2019

(65) Prior Publication Data
US 2020/0368815 A1 Nov. 26, 2020

(51) Int. Cl.
*B22F 3/105* (2006.01)
*B22F 12/20* (2021.01)
(Continued)

(52) U.S. Cl.
CPC ............ *B29C 64/364* (2017.08); *B22F 12/20* (2021.01); *B22F 12/90* (2021.01); *B29C 64/153* (2017.08);
(Continued)

(58) Field of Classification Search
None
See application file for complete search history.

(56) References Cited

U.S. PATENT DOCUMENTS

2014/0332507 A1* 11/2014 Fockele ................. B23K 26/32
219/121.61
2015/0097308 A1* 4/2015 Batchelder ............ B29C 64/106
264/40.6

(Continued)

FOREIGN PATENT DOCUMENTS

CN      106799832 A     6/2017
CN      206425550 U     8/2017
(Continued)

OTHER PUBLICATIONS

Machine Translation of DE-102017118831-A1 (Year: 2018).*
(Continued)

*Primary Examiner* — Anthony M Liang
(74) *Attorney, Agent, or Firm* — Alleman Hall & Tuttle LLP (57) ABSTRACT

A method for use in additive manufacturing of a three-dimensional workpiece is described. The method includes depositing material onto a substrate to form a shape of the workpiece in accordance with an additive manufacturing process; determining a thermal characteristic of at least a portion of the workpiece during the additive manufacturing process; determining that the thermal characteristic of at least the portion exceeds a threshold associated with the portion; adjusting a cooling parameter of a cooling flow to be applied to the workpiece responsive to determining that the thermal characteristic of at least the portion exceeds the threshold associated with the portion; and applying the cooling flow with the adjusted cooling parameter to at least the portion of the workpiece.

14 Claims, 8 Drawing Sheets

(51) Int. Cl.
*B22F 12/90* (2021.01)
*B29C 64/153* (2017.01)
*B29C 64/268* (2017.01)
*B29C 64/364* (2017.01)
*B29C 64/393* (2017.01)
*B33Y 40/00* (2020.01)
*B22F 10/25* (2021.01)
*B22F 10/80* (2021.01)
*B22F 12/53* (2021.01)
*B33Y 10/00* (2015.01)
*B33Y 30/00* (2015.01)
*B33Y 50/02* (2015.01)

(52) U.S. Cl.
CPC .......... *B29C 64/268* (2017.08); *B29C 64/393* (2017.08); *B33Y 40/00* (2014.12); *B22F 10/25* (2021.01); *B22F 10/80* (2021.01); *B22F 12/53* (2021.01); *B33Y 10/00* (2014.12); *B33Y 30/00* (2014.12); *B33Y 50/02* (2014.12)

(56) References Cited

U.S. PATENT DOCUMENTS

| | | | | |
|---|---|---|---|---|
| 2015/0321422 | A1* | 11/2015 | Boyer | B29C 64/153 425/150 |
| 2016/0039120 | A1* | 2/2016 | Dikovsky | B33Y 80/00 425/175 |
| 2016/0260248 | A1* | 9/2016 | Choi | G06T 19/00 |
| 2017/0051386 | A1* | 2/2017 | Carter | B22F 5/04 |
| 2017/0072626 | A1 | 3/2017 | McConville et al. | |
| 2018/0111320 | A1* | 4/2018 | Zhao | B29C 64/393 |
| 2018/0117822 | A1 | 5/2018 | McGee et al. | |
| 2018/0194080 | A1* | 7/2018 | El-Siblani | B33Y 50/02 |
| 2018/0264590 | A1* | 9/2018 | Goldfine | B23K 15/0093 |
| 2018/0264750 | A1 | 9/2018 | Tierney et al. | |
| 2018/0341248 | A1* | 11/2018 | Mehr | G06N 3/08 |
| 2019/0001437 | A1 | 1/2019 | Mathisen et al. | |
| 2019/0022946 | A1* | 1/2019 | Jones | B33Y 30/00 |
| 2019/0047089 | A1* | 2/2019 | Riemann | B22F 12/00 |
| 2019/0134754 | A1 | 5/2019 | Jacquemetton et al. | |
| 2019/0337232 | A1* | 11/2019 | Prabha Narra | G06F 30/23 |
| 2020/0198010 | A1* | 6/2020 | Edelhäuser | B22F 10/28 |

FOREIGN PATENT DOCUMENTS

| | | | |
|---|---|---|---|
| CN | 207028201 | U | 2/2018 |
| CN | 108973132 | A | 12/2018 |
| DE | 112014006177 | T5 | 9/2016 |
| DE | 102017118831 | A1 * | 2/2019 ............ B22F 3/1055 |
| JP | 2017056724 | A | 3/2017 |
| JP | 2019048450 | A | 3/2019 |
| WO | 2018052487 | A1 | 3/2018 |
| WO | 2018217903 | A1 | 11/2018 |

OTHER PUBLICATIONS

European Patent Office, Extended European Search Report Issued in Application No. 20162933.4, Sep. 4, 2020, Germany, 12 pages.

Lin, K et al. "A Design of Constant Temperature Control System in 3D Printer" Proceedings of the 2016 International Conference on Consumer Electronics—Taiwan, May 27, 2016, Puli Township, Taiwan, 2 pages.

"Field-programmable gate array—Wikipedia, the free encyclopedia", Retrieved from https://en.wikipedia.org/wiki/Field-programmable_gate_array, Apr. 16, 2019, 14 Pages.

"Cold Air Guns" Retrieved from https://www.brauer.co.uk/cold-air-guns-s433.aspx, Retrieved on Mar. 26, 2019, 4 pages.

"Model No. R03S" Midwest Pressure Systems, Inc., Retrieved from https://www.midwestpressuresystems.com/air-pressure/R03S-Brochure.pdf, retrieved on May 23, 2019, 2 pages.

"STC Inert Gas Self-Circulation Cooling System", SentroTech, Retrieved from https://www.sentrotech.com/stc-inert-gas-self-circulation-cooling-system/, retrieved on Mar. 26, 2019, 2 pages.

"ThermoCube 300A/400A", Solid State Cooling Systems, Retrieved from https://www.sscooling.com/products/benchtop-chillers/item/thermocube-air-cooled-300a-pressurized-gas-chiller-for-lab-laser-inert-gas, retrieved on May 23, 2019, 1 page.

Mukherjee, T., et al. "Mitigation of thermal distortion during additive manufacturing." Scripta materialia 127 (2017): 79-83, 5 pages.

European Patent Office, Extended European Search Report Issued in Application No. 21202333.7, Jan. 21, 2022, Germany, 10 pages.

China National Intellectual Property Administration, Office Action and Search Report Issued in Application No. 202010442508.2, Sep. 7, 2023, 16 pages.

European Patent Office, Office Action Issued in Application No. 21202333.7, Nov. 13, 2023, Netherlands, 9 pages.

Japan Patent Office, Office Action Issued in Application No. 2020048033, Jan. 22, 2024, 6 pages.

European Patent Office, Office Action Issued in Application No. 21202333.7, Apr. 11, 2024, Netherlands, 8 pages.

* cited by examiner

ADDITIVE MANUFACTURING WITH ADJUSTED COOLING RESPONSIVE TO THERMAL CHARACTERISTIC OF WORKPIECE

FIELD

The present disclosure relates to additive manufacturing (AM) systems and methods, and in particular to controlled cooling of workpieces during an additive manufacturing process.

BACKGROUND

Additive manufacturing (AM) refers to processes of joining materials to make parts from 3D model data, usually layer upon layer. In recent years, additive technologies have been adopted in a variety of manufacturing sectors, including aerospace, automotive, medical, and consumer products.

The materials that can be used to produce workpieces in AM processes vary widely, and include plastics, metals, ceramics, and composites. These materials are typically supplied in liquid or powder form, heated during the AM process, and then bound together. For example, in molten material systems, a pre-heating chamber raises the material temperature to melting point so that the material can flow through a delivery system. When thermoplastics are used, AM processes often involve laser sintering techniques that use a laser as the power source to sinter powdered material, binding the material together to create a solid structure. When metallic parts are built, frequently used techniques include partial-melting processes and complete-melting processes. Heat treatment may be applied to reduce the thermal residual stresses or optimize the microstructure of the fabricated metallic parts.

In each of these AM processes, uncontrolled heating and cooling of different parts of the workpiece can result in inconsistent physical, thermal, mechanical, and/or chemical properties throughout the workpiece, for example, due to differing microstructures and grain sizes in the resultant workpiece. For this reason, additively manufactured parts are often distorted because of spatially variable heating and cooling. For some materials additively manufactured layer-wise, consistent anisotropic properties are important to maintain throughout the workpiece, and uncontrolled cooling can negatively affect such properties. In view of the above, a challenge exists to properly control the heating and cooling of workpieces during AM processes in order to manufacture high quality workpieces.

SUMMARY

To address the above issues, according to one aspect of the present disclosure, a method for additive manufacturing of a three-dimensional workpiece is provided. In this aspect, the method includes depositing material onto a substrate to form a shape of the workpiece in an additive manufacturing process and determining a thermal characteristic of at least a portion of the workpiece during the additive manufacturing process. The method further includes determining that the thermal characteristic of at least the portion exceeds a threshold associated with the portion and adjusting a cooling parameter of a cooling flow to be applied to the workpiece responsive to the determination. The method further includes applying the cooling flow with the adjusted cooling parameter to at least the portion of the workpiece.

Another aspect of the present disclosure relates to an additive manufacturing apparatus with an additive manufacturing deposition head, a cooling applicator configured to apply coolant, a processor operatively coupled to the deposition head and the cooling applicator, and a memory storing instructions that, when executed by the processor, cause the apparatus to perform the method described above.

Yet another aspect of the present disclosure relates to a method for additive manufacturing of a three-dimensional workpiece as follows. The method in this aspect includes depositing material onto a substrate to form a shape of the workpiece in accordance with an additive manufacturing process and measuring thermal characteristics of a plurality of portions of the material. Each of the plurality of portions has a corresponding upper threshold, a corresponding lower threshold, and a corresponding threshold period of time. The method further includes determining whether a thermal characteristic of a given portion of the plurality of portions exceeds the corresponding upper threshold associated with the given portion for the corresponding threshold period of time at which the corresponding upper threshold is exceeded. The method further includes pausing the deposition of material and increasing coolant application to the given portion responsive to the determination that the thermal characteristic of the given portion exceeds the corresponding upper threshold for the corresponding threshold period of time. The method further includes applying the coolant until it is determined that the thermal characteristic of the given portion is lower than the corresponding lower threshold associated with the given portion, decreasing coolant application and resuming the deposition of material responsive to determining that the thermal characteristic of the given portion is below the corresponding lower threshold for the corresponding threshold period of time.

The features, functions, and advantages that have been discussed can be achieved independently in various embodiments or may be combined in yet other embodiments further details of which can be seen with reference to the following description and drawings.

DETAILED DESCRIPTION

In view of the considerations discussed above, systems and methods are provided to cool portions of a workpiece that is additively manufactured. When a thermal characteristic, such as temperature or time-at-temperature, of the workpiece is determined, through measurement or computational simulation, to exceed a threshold, cooling of the workpiece is adjusted to properly cool the workpiece. As a result, target mechanical and dimensional properties can be more reliably achieved. Thermal history data about the thermal characteristics exhibited by the workpiece and cooling performed on the workpiece during the AM process are recorded and outputted for later reference, as discussed in detail below. This thermal history information is used for a variety of purposes, including for example, to detect anomalies in manufactured workpieces and to modify downstream manufacturing operations to improve quality.

Figure 1:
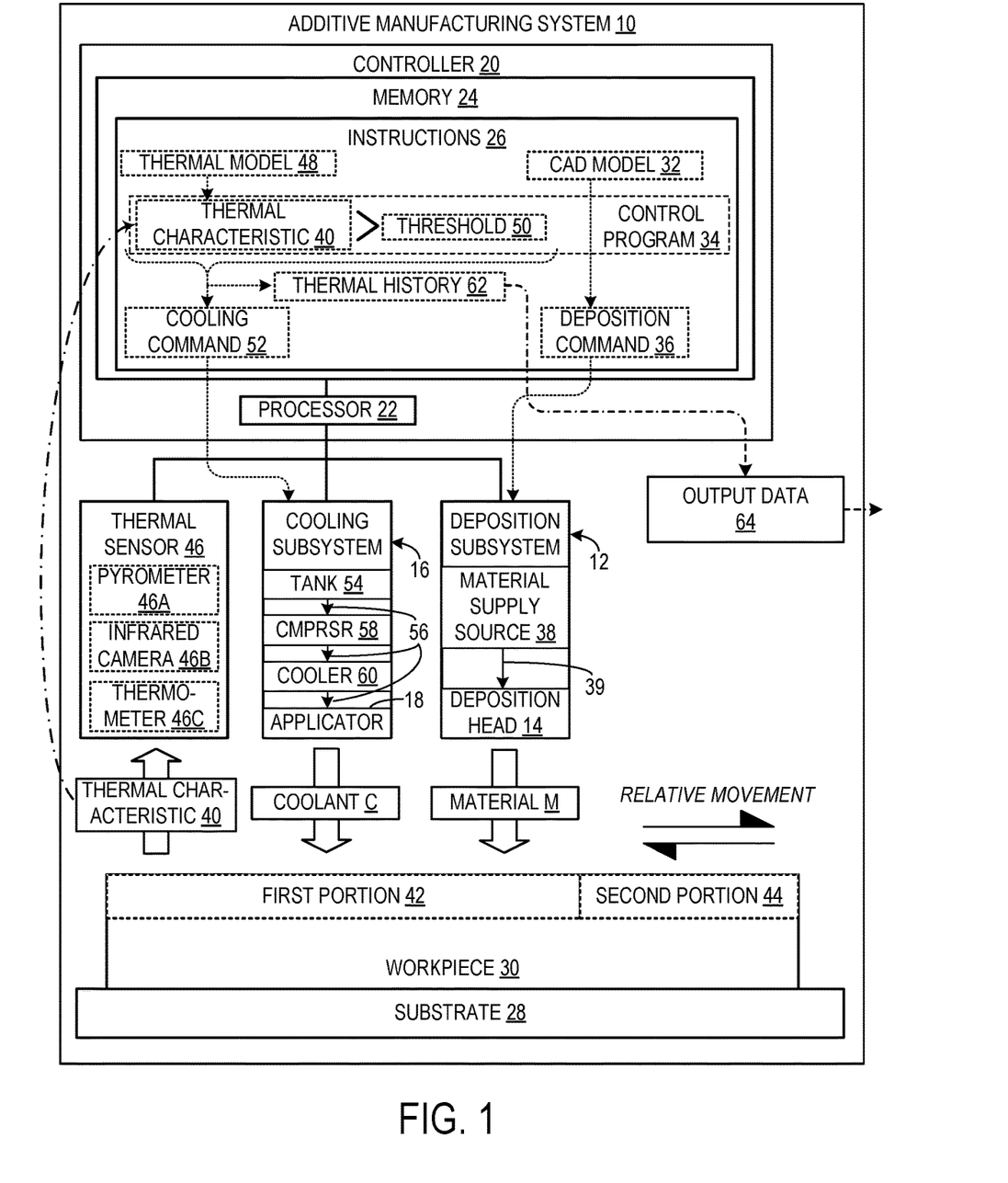
FIG. 1 shows an illustration depicting an AM system according to an example embodiment of the present disclosure.

Referring initially to FIG. 1, an AM system 10 is provided comprising a deposition subsystem 12 including an AM deposition head 14 configured to deposit a material M, a cooling subsystem 16 including a cooling applicator 18 configured to apply coolant C, a controller 20 including a processor 22 operatively coupled to the deposition head 14 and the cooling applicator 18, and a memory 24 storing instructions 26 that, when executed by a processor 22, cause the processor 22 to control the system 10 to perform operations of the AM processes described herein.

The processor 22 is a microprocessor that include one or more of a central processing unit (CPU), a graphical processing unit (GPU), an application specific integrated circuit (ASIC), a system on chip (SOC), a field-programmable gate array (FPGA), a logic circuit, or other suitable type of microprocessor configured to perform the functions recited herein. The memory typically includes non-volatile memory that retains stored data even in the absence of externally applied power, such as FLASH memory, a hard disk, read only memory (ROM), electrically erasable programmable memory (EEPROM), etc., and volatile memory such as random access memory (RAM), static random access memory (SRAM), dynamic random access memory (DRAM), etc., which temporarily stores data only for so long as power is applied during execution of programs. The instructions 26 include one or more programs and data used by such programs sufficient to perform the operations described herein.

The processor 22 of controller 20 is configured to cause the AM manufacturing system 10 to perform an AM process that includes depositing material M onto a substrate 28 to form a shape of a workpiece 30. The shape of the workpiece 30 is typically defined in a Computer Aided Drafting (CAD) model 32, which may be in a variety of formats such as Standard Tessellation Language (STL) or Additive Manufacturing Format (AMF). The workpiece 30 may take a virtually limitless variety of forms and sizes, including gears, shafts, tubes, frames, and housings that span several millimeters, centimeters, or even meters in length. The CAD model 32 is interpreted by a control program 34 which then creates a manufacturing plan including a plurality of deposition paths stacked in layers to form the workpiece additively. Each deposition path occurs within a layer by relative movement of the deposition head 14 and the workpiece during deposition of the layer. The control program 34 causes the processor 22 to send deposition commands 36 to the deposition subsystem 12 which cause the deposition head 14 to be moved to an appropriate position along the deposition paths and to deposit material M drawn from the material supply source 38 via material feed line 39 in accordance with the manufacturing plan.

During the AM process, the processor 22 is configured to determine a thermal characteristic 40 of at least a portion of the workpiece 30, such as first portion 42 or second portion 44. In the paragraphs that follow, the determination of the thermal characteristic and subsequent cooling with be described with reference to first portion 42, although it will be appreciated that this description is equally applicable to second portion 44. A variety of thermal characteristics of first portion 42 may be determined. For example, the thermal characteristic 40 may be time at temperature, that is, a cumulative time period that a portion of the workpiece has spent at a threshold temperature. Other example thermal characteristics 40 that may be determined include temperature gradients, peak temperature over time or within a region, and average temperature over time or within a region.

The thermal characteristic 40 of the portion may be determined by measuring a surface temperature of the portion, for example. The surface temperature of the first portion 42 may be measured by a thermal sensor 46. Examples of suitable thermal sensors include a pyrometer 46A, an infrared camera 46B, and a thermometer 46C, although other types of thermal sensors may alternatively be used. In one specific example, a non-contact infrared pyrometer 46A may be used. As an alternative to direct measurement of the workpiece, the thermal characteristic 40 may be determined based on a computer simulation using a thermal model 48 of the AM process for the workpiece, so that both internal and external temperatures of the first portion 42 can be estimated. The computer simulation includes a finite element analysis of the heat transfer caused by deposition of the material during the AM process. Thus, in this example the thermal model 48 includes a finite element model (FEM) based on the CAD model 32, which includes a representation of the workpiece 30 at each stage of manufacture as additional deposition elements are added in each layer of the workpiece 30.

The processor 22 is configured to determine that the thermal characteristic 40 of at least the portion 42 exceeds a threshold 50 associated with the first portion 42. In one example, when the thermal characteristic 40 is time at temperature, the threshold 50 includes a threshold period of time at which a threshold temperature is exceeded. When a computer simulation is used to estimate a temperature of the workpiece, the threshold 50 may be a threshold temperature, temperature gradient, average temperature, time at temperature, etc., of a finite element or region of such elements in the FEM model, for example.

The processor 22 is further configured to issue a cooling command 52 to the cooling subsystem 16 to adjust a cooling parameter of the cooling flow of the coolant C to be applied to the workpiece 30 responsive to determining that the thermal characteristic 40 of at least the first portion 42 exceeds the threshold 50 associated with the first portion 42. The processor 22 is also configured to apply the cooling flow of the coolant C with the adjusted cooling parameter to at least the first portion 42 of the workpiece 30, via the cooling subsystem 16. The cooling flow of the coolant C proceeds from cooling tank 54, via cooling line 56 and valve V5, through a compressor 58 and cooler 60 to be emitted by applicator 18 toward the workpiece 30. The determined thermal characteristic 40 of the first portion 42 of the workpiece 30 may be stored in memory 24 as part of a thermal history 62 of the workpiece 30. A more detailed description of thermal history 62 is presented below in reference to FIGS. 5 and 6. The thermal history 62 may be outputted by the processor 22 as output data 64, which may be a data file or collection that is stored on media or is transmitted over a computer network to a receiving computing device. The thermal history 62 may enable downstream examination of the actual conditions of the workpiece during manufacture, for example, during an inspection prior to the part being placed into service, or during an inspection after the part has spent time in service. As another example, the thermal histories 62 of a set of workpieces 30 may be compared to determine a distribution of quality characteristics among the set.

Threshold 50 may vary based on the location of the first portion 42 within the workpiece 30, and also may vary depending on the material M being deposited to form the workpiece 30. Further, the threshold 50 may vary based on a current stage of the AM process. The threshold 50 may be set to an operating temperature that has an effect on the material properties of the solidified workpiece. In one specific example, titanium alloys have two main phases, alpha and beta. A titanium alloy's beta transus temperature is around 1800° F. or higher. Aging temperatures are approximately 1200-1400° F. Microstructure and the subsequent material properties of the fabricated workpiece 30 can vary significantly depending on time at temperature above or just below the beta transus, cooling rate from these elevated temperatures, and time at or around aging temperature. Heat treatment affects the size, shape, and proportion of these phases and subsequent material properties. By controlling the thermal conditions of the workpiece 30 during manufacture, the microstructure of the final workpiece 30 can be controlled. To achieve this control, for example, the threshold 50 may be set to the beta transus temperature of the material M, which in one specific example may be 1800° F., or to a predetermined value below the beta transus temperature, or to a temperature that is within the aging temperature range, such as 1300° F.

The cooling parameter may be at least one of a coolant flow rate and a coolant temperature. The coolant C may be at least one of a liquid and a gas such as argon. The cooling flow may be applied until the processor 22 determines that the thermal characteristic 40 of at least the first portion 42 is below the threshold 50 associated with the first portion 42. At this point, coolant application may be decreased and the deposition of material M continued.

The adjustment of the cooling parameter may be performed by adjusting the coolant temperature and/or adjusting the cooling flow. Coolant temperature may be adjusted by altering the temperature of the coolant gas or liquid. Cooling flow may be adjusted by varying the flow rate of the emitted coolant. The variation of flow rate of the coolant may be achieved by adjusting the coolant compressor 58, which regulates the pressure of the coolant C. The first portion 42 may be rapidly cooled or cooled at a more moderate pace depending on the temperature of the coolant C. The cooling application may proceed intermittently, or continuously in conjunction with the AM process.

Accordingly, the controlled cooling application prevents the first portion 42 from becoming too hot. Benefits of such a controlled cooling application include tailored mechanical properties and microstructure, consistent deposition layer heights, reduced defect counts, reduced grain growth, reduced residual stress, and providing a predictable starting stock. Such benefits can be linked to savings on inspection, programming, and machining of the final workpiece 30, potentially reducing or eliminating post-deposition treatment. Thresholds 50 for thermal characteristics 40 and coolant flow rates and coolant temperatures can be set based on the material used and the desired mechanical properties.

In certain embodiments, the portion of the workpiece may be a first portion 42 as described above, and the threshold 50 may be a first threshold, the coolant parameter may be a first cooling parameter, and the workpiece 30 may further include a second portion 44. The AM process may further include determining whether a thermal characteristic of the second portion 44 exceeds a second threshold associated with the second portion 44, the second threshold configured to be different from the first threshold, adjust a second cooling parameter of a cooling flow to be applied to the workpiece 30 responsive to determining that the thermal characteristic of the second portion 44 exceeds the second threshold associated with the second portion 44, the second cooling parameter configured to be different from the first cooling parameter, apply the cooling flow with the second cooling parameter to the second portion 44 of the workpiece 30, and decreasing coolant application and continuing the deposition of material responsive to determining that the thermal characteristic of the second portion 44 is below the second threshold associated with the second portion 44. In this way, the cooling of the workpiece 30 may be tailored based on a spatial configuration of the workpiece, such that different thresholds are applied, and thus different cooling commands are generated for the first portion 42 and second portion 44.

Figure 2:
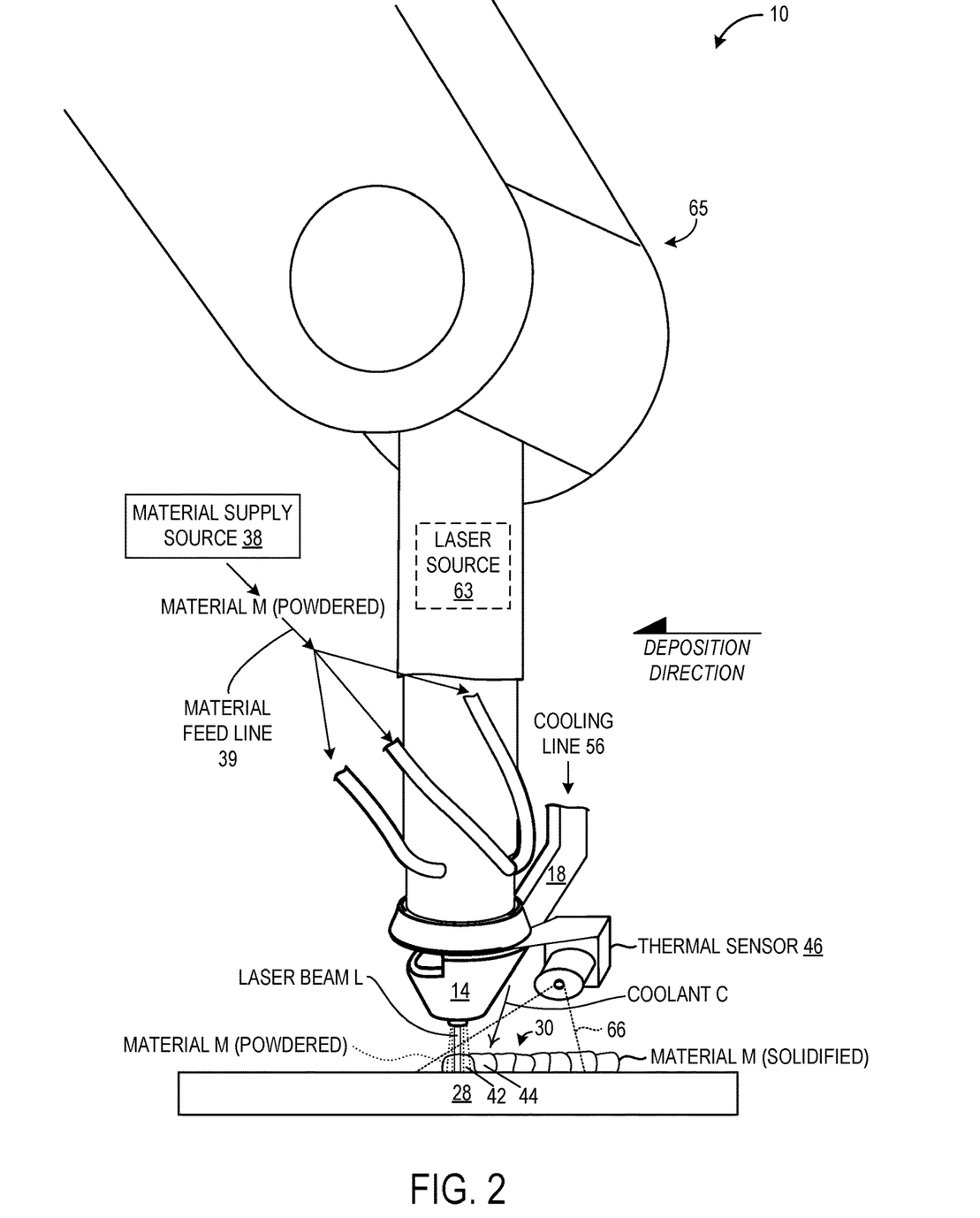
FIG. 2 shows a partial illustration of a deposition head, coolant applicator, and thermal sensor equipped on a robotic arm of the AM apparatus of FIG. 1.

FIG. 2 illustrates one example configuration for the deposition head 14 and cooling applicator 18 of the AM system 10 of FIG. 1. As shown, material M may be supplied to the deposition head 14 from a material supply source 38 via material feed lines 39, thereby allowing the deposition head 14 to deposit the material M as a series of deposits to build the 3D workpiece 30 in a piece-by-piece, layer-by-layer manner. The material supply source 38 may be a powder supply container, for example. In other examples, a filament spool or cassette may be used. The deposition head 14 may be a nozzle with a fixed or variable nozzle diameter for ejecting powdered material M, for example. In other configurations, an extrusion nozzle may be used. Further two or more of the depicted nozzles may alternatively be included in the deposition head 14. In other words, the nozzle diameters and number of nozzles may vary between machines. In some configurations, the nozzle 14 may be configured as a co-axial head with a tapered cone design that provides powdered material a full 360 degrees around a melt pool created by a laser, directing powdered material to the melt pool created by the laser.

A laser source 63 or other light source may be provided within the deposition head 14 to use as a power source to emit a laser beam L that sinters the ejected powdered material M, binding the material M together to create a solid structure of sintered material. As the deposition head 14 is moved by the robotic arm of the robot 65 in the deposition direction relative to the workpiece 30, powdered material M is caused to bind by the laser beam L, and a line of solidified material M is formed. The material M deposited onto the substrate 28 is not particularly limited and may be a metal such as steel and its alloys, titanium and its alloys, nickel, aluminum, copper, magnesium, cobalt-chrome, or tungsten. Further, the material M may be a polymer or composite material. In the depicted embodiment, the deposition head 14 and the coolant applicator 18 are attached to the tip of an articulated robotic arm of a robot 65. However, it will be appreciated that deposition head 14 and coolant applicator 18 may alternatively be provided on separate robotic arms. The movement of the deposition head 14 is also not limited to being moved by a robotic arm of a robot, and the deposition head 14 may alternatively be moved via a gantry or platform, for example. In other embodiments, the deposition head 14 the coolant applicator 18 may be fixed in set locations, while a mobile platform moves the workpiece 30 on the substrate 28 to facilitate the AM process. The thermal sensor 46 is illustrated as mounted to the robotic arm in FIG. 2. Alternatively, it will be appreciated that the thermal sensor may be mounted to a separate robotic arm than the coolant applicator 18 and deposition head 14, or may be mounted to another surface, such as a wall of a manufacturing enclosure, for example. The thermal sensor 46 is positioned such that a range of measurement 66 for the thermal sensor 46 encompasses at least the first portion 42 and the second portion 44 of the workpiece 30.

Figure 3:
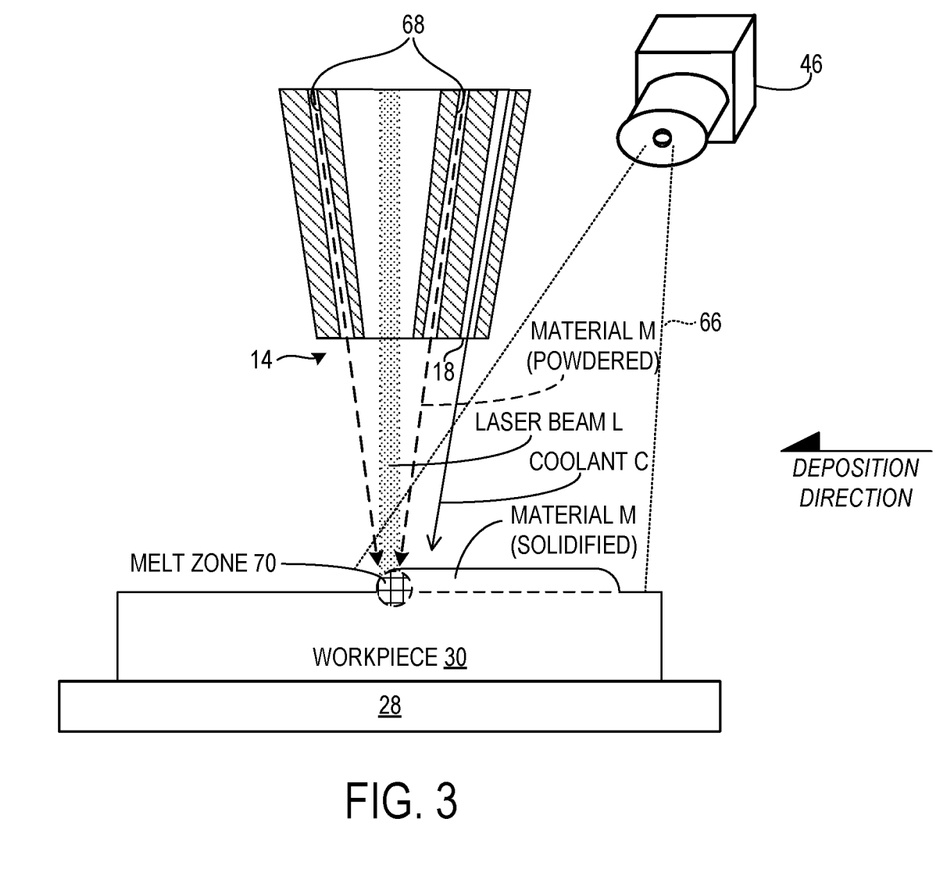
FIG. 3 shows a partial sectional view of the deposition head of FIG. 2, with the thermal sensor positioned in a vicinity thereof.

FIG. 3 illustrates a section of the deposition head 14 and cooling applicator 18 of the example embodiment of FIGS. 1 and 2. As shown, powdered material M is carried through internal passages 68 in the deposition head 14, and flows to a melt zone 70 at the deposition site, at which location the laser beam L provides energy that melts and sinters the powdered material M, causing it to bind (upon heating) and solidify (upon cooling) into solidified material M. It will be appreciated that deposition head 14 moves in a deposition direction relative to the workpiece 30 during deposition, with movement of either deposition head 14 or workpiece 30 or both being possible to accomplish this relative movement. The cooling of the deposited material occurs after the deposited material M is moved out of the melt zone 70 of the laser beam L, and/or after the laser beam L is turned off. Coolant C flows through the cooling applicator 18 and is directed to cool the deposited material M. As in FIG. 5, the thermal sensor 46 is illustrated as having a range of measurement 66 that includes at least a portion of the deposited material M, and therefore can measure the thermal characteristic 40 of the deposited material M of a portion of the workpiece 30. Feedback control of the cooling flow based on the measured thermal characteristic 40 will be described below.

Figure 4:
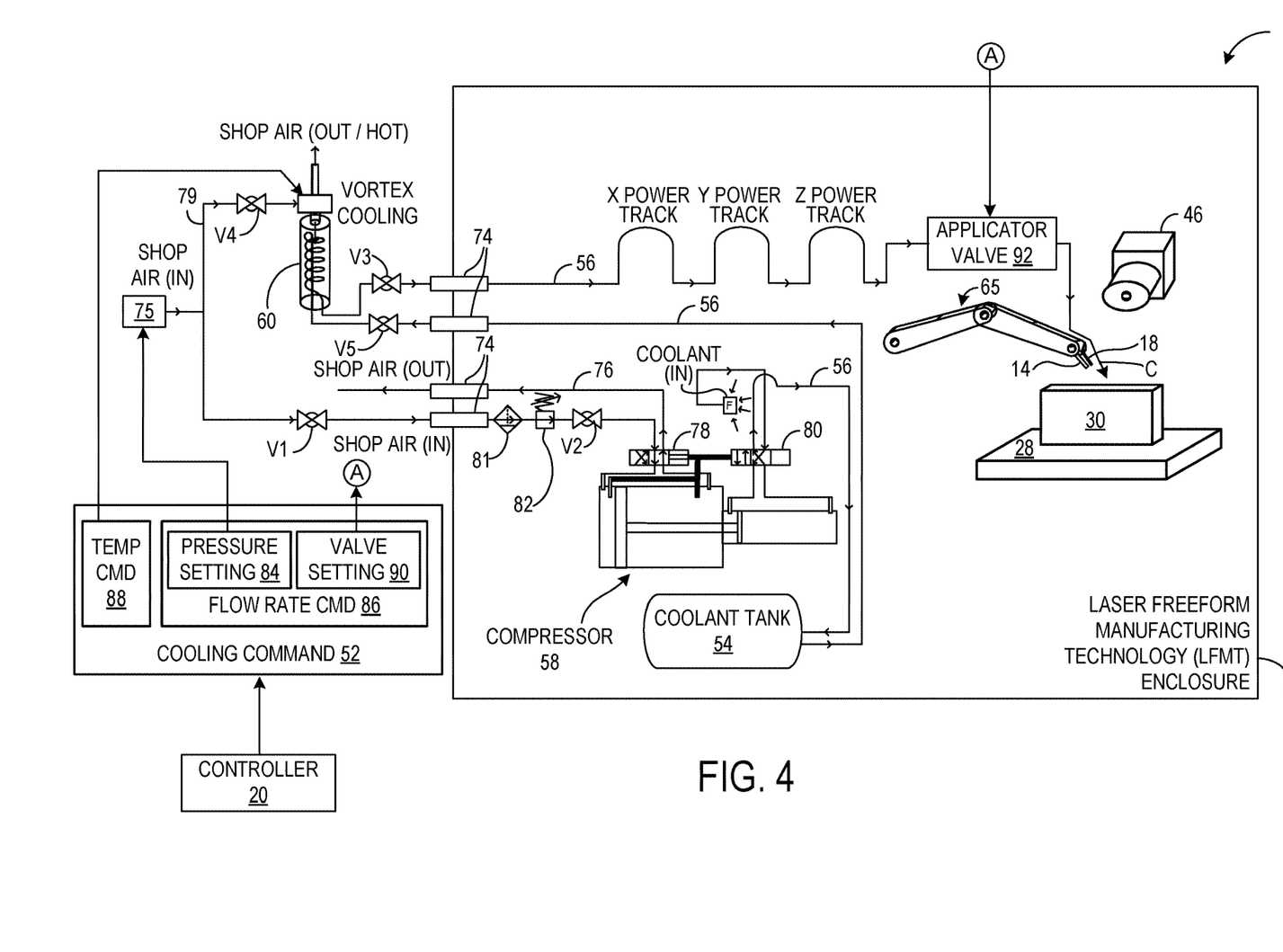
FIG. 4 shows an illustration depicting a cooling subsystem of the AM system of FIG. 1.

FIG. 4 illustrates one possible cooling flow path of the example embodiment of FIG. 1. As shown, coolant C is supplied from a coolant tank 54, which is contained within an enclosure 72, illustrated as a laser freeform manufacturing technology (LFMT) enclosure. The enclosure 72 is typically substantially airtight, i.e., hermetically sealed and substantially filled with an inert gas, such as argon. In this embodiment, the coolant C is an inert gas, such as argon, which is filtered and drawn into the coolant tank 54 for temporary storage and cooling. In other embodiments, another gas or a liquid may be used as the coolant C. The coolant C in the coolant tank 54 is flows under pressure generated by compressor 58 out of the enclosure 72 into cooler 60 for cooling and back into the enclosure 72, passing through hose couplers 74 at the edge of the enclosure 72. The compressor 58 is a bootstrap compressor that is powered by shop air, which is air from the environment that has been pressured to a working pressure via an external air compressor 75. Other types of compressors may alternatively be used. Shop air is fed into the enclosure 72 through a coupler 74, passes to the compressor 58 via a shop air loop line 76, and powers a turbine 78 within the compressor 58. The turbine 78 within the compressor 58 is mechanically linked to and rotates an impeller 80 in the cooling line 56, thereby pressurizing the cooling line 56. Shop air is fed out of the compressor 58 via the shop air loop line 76, passes through the enclosure 72 via another coupler 74, and is exhausted to environment. Valves V1, V2 are provided on the inlet side and within the enclosure 72 on the shop air loop line 76 for controlling flow of the shop air to compressor 58. Valves V1 and V2 may be manually adjusted or actuated under the command of the controller 20.

The cooler 60 is depicted as a vortex cooler in FIG. 4. The cooler 60 transfers heat from the coolant C passing through the shop air cooler line 79 through cooler 60 to shop air, and exhausts hot shop air to the environment as shown. Compressor 58 is powered by shop air that is flowed in from outside enclosure 72 through a clear bowel 81, pressure regulator 82, and valve V2. The pressure at which the shop air is provided in shop air loop line 76, which is proportional to the pressure in the cooling line 56, is set according to the pressure setting 84, which is set as part of cooling command 52 issued by the processor 22 of controller 20.

Cooling command 52 issued by controller 20 includes either one or both of a flow rate command 86 and a temperature command 88. The flow rate command 86 includes one or more valve settings 90. One particular valve setting 90 included in the flow rate command is a coolant applicator valve setting that is transmitted to the applicator valve 92, and which controls the flow rate of coolant C supplied by cooling line 56 and ejected toward the workpiece 30. Other valve settings 90 may be included in the flow rate command and transmitted to the valves V1, V2, V3 to achieve a flow rate change in the cooling line 56. Temperature command TMP may be transmitted to the cooler 60 to set a setpoint of the cooler to a desired temperature, and/or to adjust a valve setting of valve V4. In this manner the temperature of the coolant in cooling line 56 may be controlled. Alternatively, a plurality of independent cooling lines 56 may be provided and may be cooled to different temperatures, and a mixing valve may be provided as the applicator valve AV, and the temperature command may include a valve setting for the mixing valve, to thereby mix the two coolants C of different temperatures from the different cooling lines at a desired mixing ratio to achieve a desired temperature of the coolant C emitted to the workpiece.

Between the inbound coupler 74 on the cooling line 56 after the cooler 60, sufficient flexible hose is provided in the cooling line 56 to accommodate movement of the coolant applicator 18 by robot 65 along a X power track, Y power track, and Z power track, in this order. In the depicted embodiments, the coolant applicator 18, deposition head 14, and thermal sensor 46 are co-mounted to one articulated robotic arm. Alternatively, a plurality of robotic arms may be provided and these components each may be independently mounted on a respective robotic arm. Further, other types of mechanisms besides an articulated robotic arm may be utilized to achieve the relative movement between the workpiece and the deposition head 14, cooling applicator 18, and thermal sensor 46. For example, these three components may be mounted to a trunnion-style machine or a rotate swivel type machine, similar to a vertical axis or horizontal axis milling machine. With any of these configurations, the coolant applicator can realize a full range of motion in three dimensions to operate on the three-dimensional workpiece 30, while still being supplied with coolant C.

Figure 5:
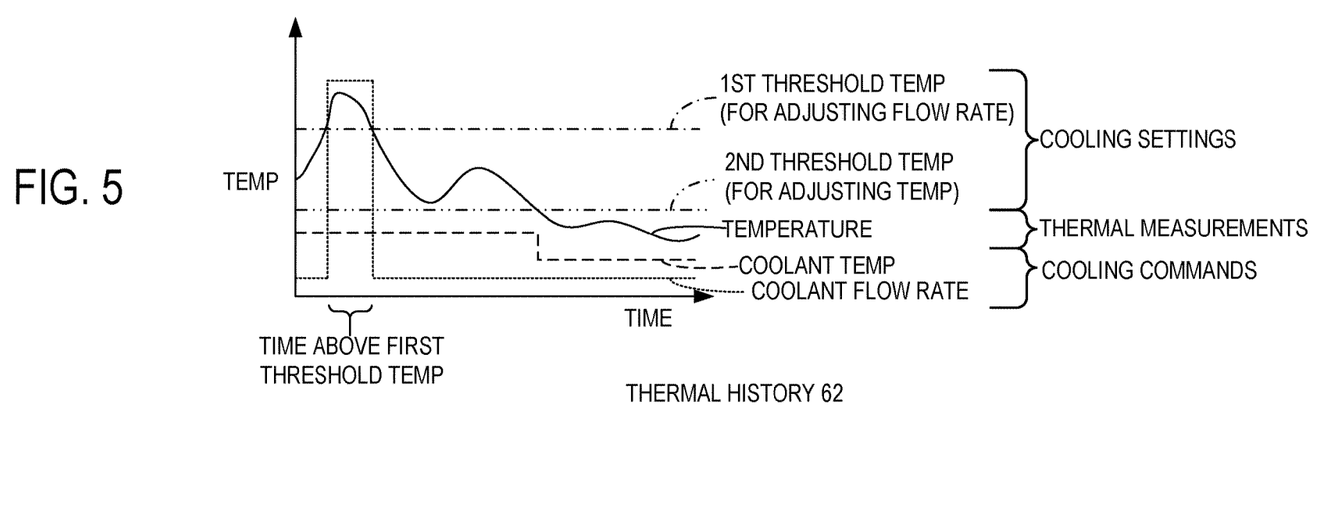
FIG. 5 shows an illustration of a thermal history of a workpiece contained in output data of the AM system of FIG. 1.

FIG. 5 illustrates an example thermal history 62 for a portion of the three-dimensional workpiece 30. The thermal history 62 includes a measured temperature for the portion of the workpiece, graphed in a solid line. The thermal history 62 also includes a first threshold temperature, illustrated by a dot-dash line, at which a flow rate of the coolant to the portion of the workpiece is adjusted, and a second threshold temperature, illustrated by a double dot dash line, at which a temperature of the coolant is adjusted. For the time at which the temperature exceeds the first temperature threshold, the coolant flow rate, indicated as a dotted line, is raised. This interval is referred to as the time above temperature for the first threshold temperature. The coolant flow rate drops back down once the temperature falls below the first threshold temperature. Further, when the temperature falls below the second threshold temperature, the coolant temperature, shows in a dash line, is reduced. Data regarding each of these parameters can be stored in thermal history 62 for later reference and comparison.

Figure 6:
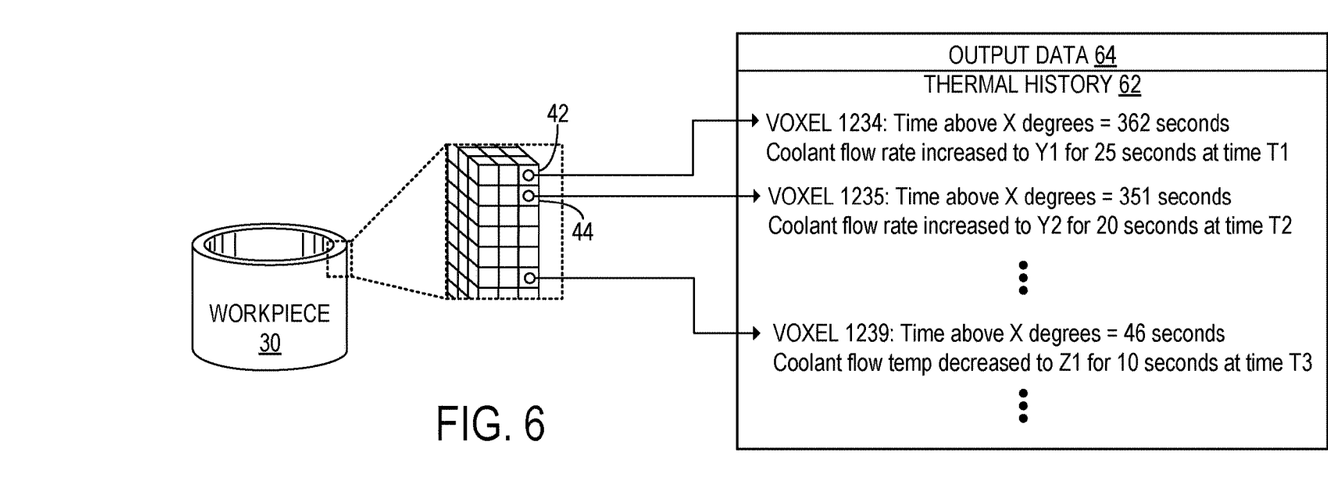
FIG. 6 shows a plot of data contained within the thermal history for a voxel range in the workpiece.

Turning now to FIG. 6, another example of the thermal history 62 outputted in output data 64 is illustrated. As illustrated, the workpiece 30 may be divided into a plurality of three-dimensional voxels, roughly corresponding to the minimum deposition size, i.e., deposition resolution, of the additive manufacturing process. The illustrated thermal history 62 includes thermal data that has been measured on a voxel-by-voxel basis. Alternatively, the thermal history 62 may include thermal data for a range of voxels or for the workpiece in its entirety. It will be appreciated that the first portion 42 and second portion 44 illustrated in FIG. 1 may be respective voxels or respective ranges of voxels within the workpiece 30. The illustrated thermal history 62 includes, for each voxel, a measure of time above temperature during the manufacturing process, and a coolant flow rate. As the cooling flow is applied, a temperature, flow rate, pressure, etc. of the cooling flow may be measured.

Figure 7:
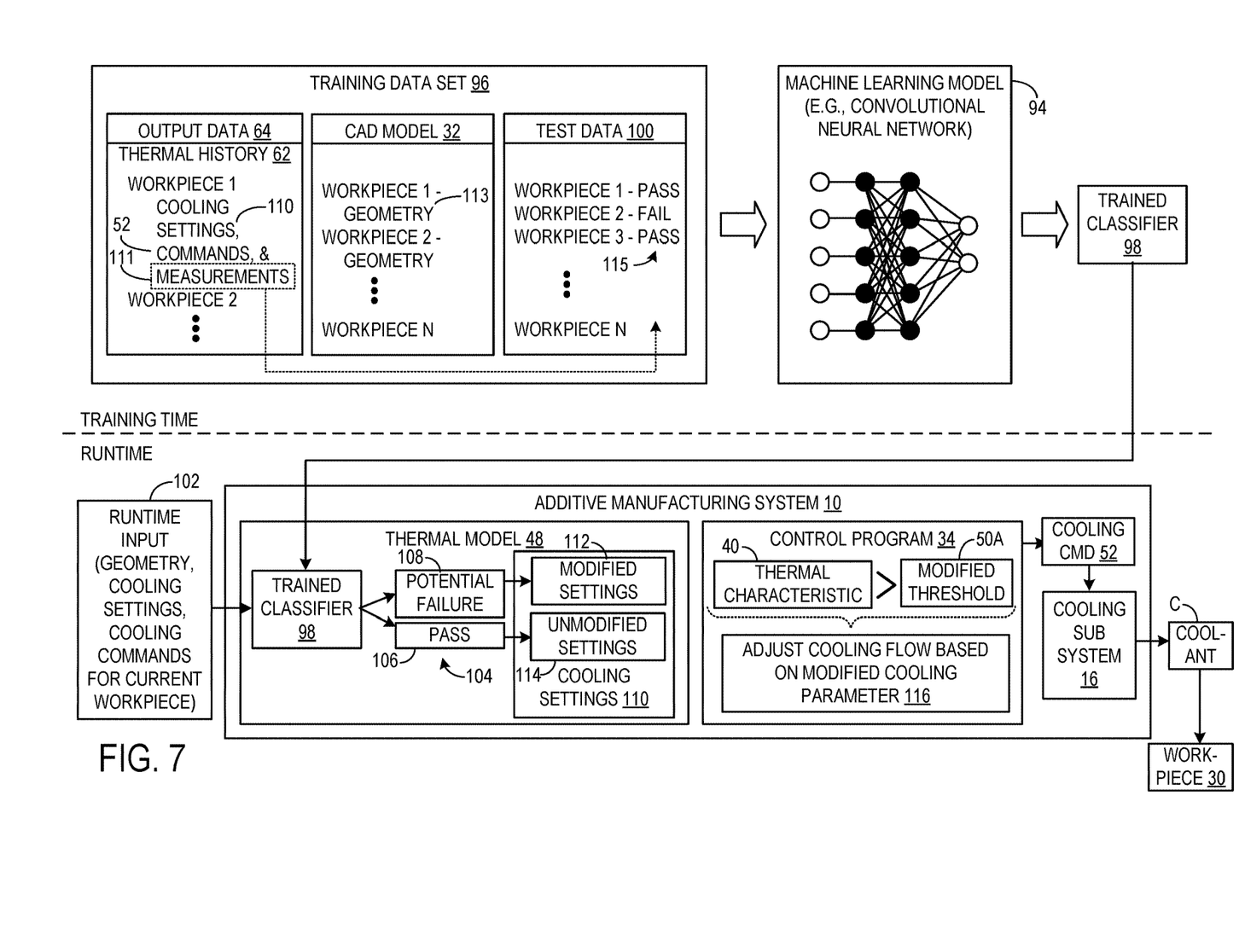
FIG. 7 shows an illustration of machine learning that is implemented by the AM system of FIG. 1.

As shown in FIG. 7, system 10 may implement a machine learning algorithm using a processor and associated memory of a training computing device to learn when cooling operations performed on workpieces 30 are potentially inadequate, and take appropriate measures using during the manufacturing process to ensure cooling operation adequacy. For example, a machine learning model 94 such as a convolutional neural network may be trained based on a training data set 96 to produce a trained classifier 98 that may be employed in additive manufacturing system 10 at run time to identify potential cooling inadequacies. The training data set 96 includes thermal history 62 of output data 64, CAD model 32, and test data 100. The thermal history 62 includes, for each workpiece, the cooling settings 110 used during manufacture, the cooling commands 52 issued during manufacture, and the thermal measurements 111 of the thermal characteristics 40 of the workpiece 30 taken during manufacture. The CAD model 32 includes, for each workpiece 30, the workpiece geometry. The CAD model 32 may also include the deposition path data used to manufacture the workpiece 30. In the depicted example, the training data set 96 includes test data 100, which in turn includes, for each workpiece 30, the test results 115 of a predetermined quality test of post-manufacture quality testing. These results can be expressed as pass or fail, or may be other categories such as high quality, medium quality, low quality, etc. The test results 115 serve as ground truth in training the machine learning model 94. The thermal measurements 111 of the thermal characteristics 40 taken with sensor 46 during manufacture of each workpiece may also be used as ground truth. To train the machine learning model 94, in the case of a convolutional neural network, an input vector is formed including the cooling settings 110 and commands 52, and the output classifications are set to be the results of the testing. In one embodiment, the thermal measurements 111 may be filtered and used as the ground truth output classifications. For example, the thermal measurements 111 may be filtered to two classifications, namely, "exceeded permitted time at temperature" and "did not exceed permitted time at temperature" for the workpiece. Using the thermal measurements 111 as the test data can greatly reduce training time of the neural network, by cutting down on the time necessary to prepare the training data set 96 for consumption by the convolutional neural network. By examining a training data set 96 for a large number of workpieces 30, a trained classifier 98 can be produced that can be used to predict when a potential failure might occur for a workpiece 30 that is about to be manufactured. Specifically, the machine learning model 94 is trained using the training computing device at training time on the training data set 96 including the thermal history 62 for a plurality of workpieces, to thereby generate a trained classifier 98 executed by the processor 22 that predicts, at runtime, whether runtime input 102 of a set of cooling commands 52 and/or cooling settings 110 for use during manufacturing a current workpiece will result in a current workpiece that passes or fails the predetermined quality test.

To this end, at runtime, a runtime input 102 is received by the processor 22 of the AM system 10. The runtime input 102 includes an input vector that can be inputted into the trained classifier 98, which is loaded into memory 24 and executed by processor 22 at runtime. The input vector includes aspects of the geometry 113 of current workpiece 30 to be manufactured from the CAD model 32 for the current workpiece 30, as well as cooling settings 110 (such as the valve settings 90 and pressure settings 84 for flow rate command 86, and temperature setting for temperature command 88) and cooling commands 52 from the thermal model 48 for the current workpiece. It will be appreciated that features may be identified in the geometry 113 of the workpiece 30, and those features may be stored in a feature vector. The runtime input vector may be formed by concatenating the feature vector with a vector for the cooling settings 110 described above and a vector for the cooling commands 52 for the current workpiece 30. Upon receiving the runtime input 102, the trained classifier 98 is configured to output a classification result 104. The classification result 104 is depicted indicate a pass 106 or a potential failure 108, and each result typically has a confidence value associated with it, which is typically expressed in percentage form (e.g., potential failure (51%), pass (78%), etc.).

If the result 104 indicates a pass, then unmodified settings 114 are used for the comparison by the control program, similar to the process described with respect to FIG. 1. If the result 104 indicates potential failure 108 with at least a threshold confidence value, such as 50%, then the cooling settings (such as the threshold 50, or first and second thresholds depicted in FIG. 5) described above may be modified prior to comparison with the thermal characteristic 40 used to generate the cooling command 52. The modification may be performed manually by an operator of the system 10 or may be performed programmatically according to preset rules or according to the results of a generative neural network or other model that is trained to generate cooling settings that do not lead to failure under test conditions, for example. If modified settings 112 are used, the control program 34 is configured to compare the thermal characteristic 40 to the modified threshold 50A, and if the modified threshold 50A is exceeded to adjust the cooling flow based on a modified cooling parameter such as a modified cooling temperature or a modified flow rate, at 116. The control program 34 outputs the cooling command 52 based on the modified cooling parameter, to thereby cool the workpiece with coolant appropriately.

In another aspect, system 10 may be used to compare the cooling operations performed on two different workpieces 30. For example, the processor 22 may output a flow rate command to set the flow rate of the coolant C, and a time duration of the coolant application. After the cooling flow is applied, the amount of cooling flow may be stored in memory 24. The amount of cooling flow may be stored in thermal history 62 of a first workpiece, for example, to inform the setting of cooling parameters in future AM processes. Accordingly, when a second workpiece is manufactured using the same AM process as the first workpiece, the thermal histories 62 of the first workpiece and the second workpiece may be compared to verify that the material properties of the first workpiece and the second workpiece are similar. In addition to the data described elsewhere herein as being included within the thermal history 62, in this aspect the thermal history 62 may include a time stamp and location stamp indicating when cooling flow was applied during the AM process, where the cooling flow was applied on the workpiece, and how much cooling flow was applied on the workpiece each time the cooling flow was applied. In addition, the thermal history 62 may include a time stamp and location stamp indicating the thermal characteristic of the portion at each point in time of the AM process. When multiple thermal histories are collected in this manner, a neural network such as that described in relation to FIG. 7 may be applied to the thermal histories to develop a machine learning model that is trained to predict which portions of the workpiece will require cooling, and how much cooling flow each portion of the workpiece will require.

Figure 8:
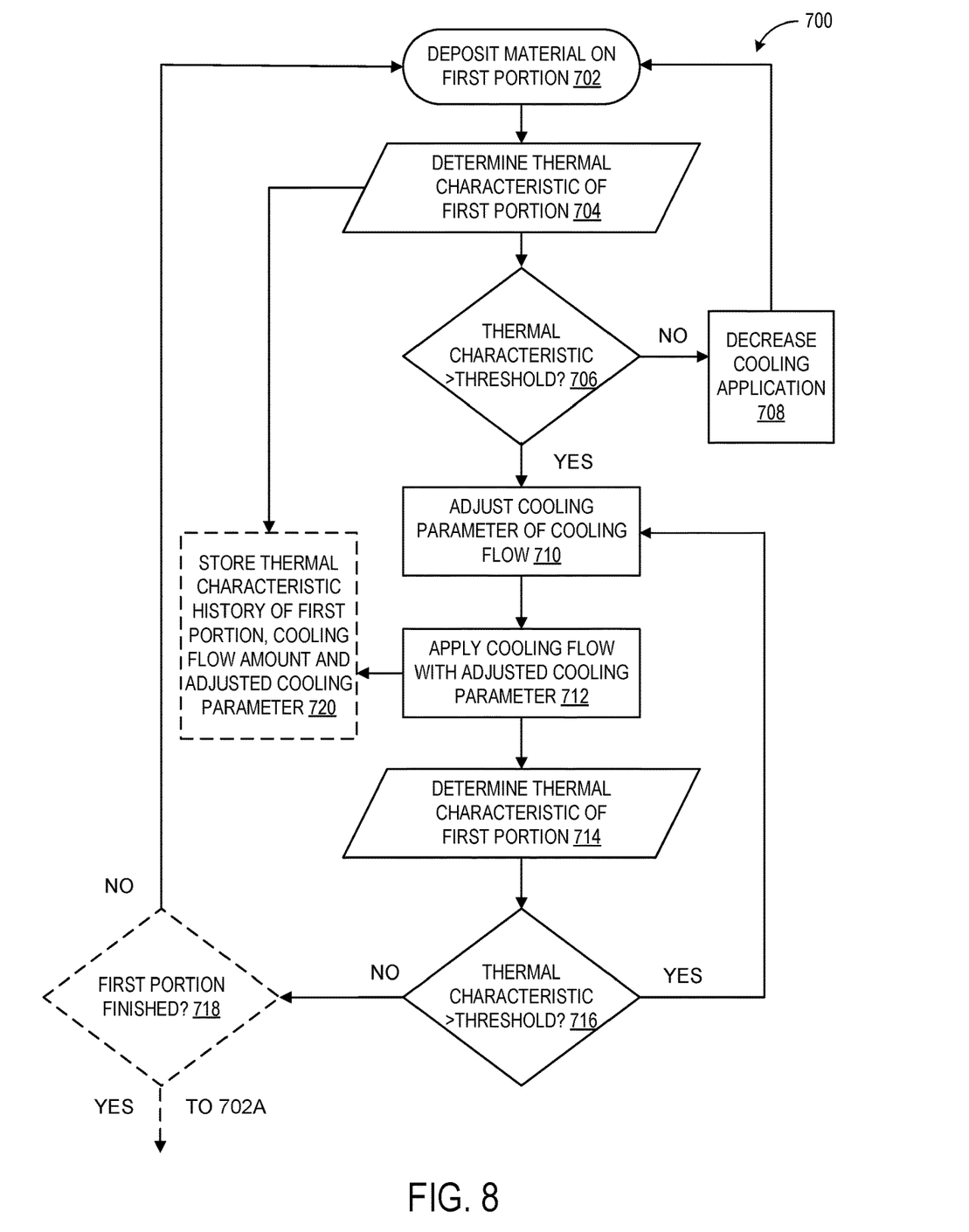
FIG. 8 shows an illustration of operations of a method performed according to an example embodiment of the present disclosure.

FIG. 8 illustrates a flow chart of an example configuration of a first method 700 according to one aspect of the present disclosure. The following description of method 700 is provided with reference to the software and hardware components described above and shown in FIGS. 1-6. It will be appreciated that method 700 also may be performed in other contexts using other suitable hardware and software components.

At step 702, the method includes depositing material onto a substrate to form a shape of the workpiece in accordance with an AM process. At step 704, the method includes determining a thermal characteristic of at least a portion of the workpiece during the AM process. At step 720, the method includes storing the determined thermal characteristic of the portion of the workpiece in memory as part of a thermal history of the workpiece. The thermal characteristic may be continuously monitored during this determination. At step 706, it is determined whether the thermal characteristic of at least the portion exceeds a threshold associated with the portion. At step 708, responsive to determining that the thermal characteristic of at least the portion does not exceed a threshold associated with the portion, the cooling application is decreased or turned off. At step 702, the deposition of material is continued.

At step 710, responsive to determining that the thermal characteristic of at least the portion exceeds the threshold associated with the portion, a cooling parameter of a cooling flow to be applied to the workpiece is adjusted. At step 712, the cooling flow is applied with the adjusted cooling parameter to at least the portion of the workpiece. At step 712, the amount of cooling flow may also be tracked or measured. At step 714, a thermal characteristic is again determined of at least a portion of the workpiece. The threshold of step 706 may be different from the threshold of step 716, or the thresholds may be configured differently from each other. It will be appreciated that, when continuous monitoring is performed, the determination of the thermal characteristic may be continuously performed during all steps of the method 700. An amount of the cooling flow may be tracked or measured. After the cooling flow is applied, the amount of cooling flow may be stored in memory at step 720. The amount of cooling flow may be stored as a thermal history of the workpiece to inform the setting of cooling parameters in future manufacturing processes. The thermal history may include a time stamp and location stamp indicating when cooling flow was applied during the AM process, where the cooling flow was applied on the workpiece, and how much cooling flow was applied on the workpiece each time the cooling flow was applied. In addition, the thermal history may include a time stamp and location stamp indicating the thermal characteristic of the portion at each point in time of the AM process. Accordingly, when a second workpiece is manufactured using the same AM process as a first workpiece, the thermal histories of the first workpiece and the second workpiece may be compared to verify that the material properties of the first workpiece and the second workpiece are similar.

At step 716, it is determined whether the thermal characteristic of at least the portion exceeds a threshold associated with the portion. Responsive to determining that thermal characteristic of at least the portion exceeds the threshold associated with the portion, the method 700 returns to step 710 to adjust the cooling parameter of the cooling flow. Responsive to determining that the thermal characteristic of at least the portion does not exceed the threshold associated with the portion, the method 700 returns to step 702 to continue the deposition of material. However, in another embodiment, responsive to determining that thermal characteristic of at least the portion does not exceed the threshold associated with the portion, the method 700 may proceed to step 718, determining whether the portion is finished, or no further deposition of the portion is necessary. When the determination is negative, the method 700 may continue to step 702 to continue the deposition of material at the portion. When the determination is positive, the method may continue to step 702A shown in FIG. 9.

Although method 700 is described as adjusting the cooling parameter of the cooling flow based on the thermal characteristic of the portion, alternatively the cooling parameter of the cooling flow may be adjusted based on a subsequent value for the thermal characteristic is determined at a later point in time. Therefore, at steps 704 and 714, instead of determining the thermal characteristic of the portion, a subsequent value for the thermal characteristic may be determined at a later point in time. At steps 706 and 716, instead of determining whether the thermal characteristic of the portion exceeds a threshold associated with the portion, it may be determined whether the subsequent value of the thermal characteristic is lower than the threshold associated with the portion. At step 710, alternatively, the adjusted cooling parameter of the cooling flow that is applied to at least the portion of the workpiece may be reduced, responsive to determining that the subsequent value for the thermal characteristic is lower than the threshold.

Figure 9:
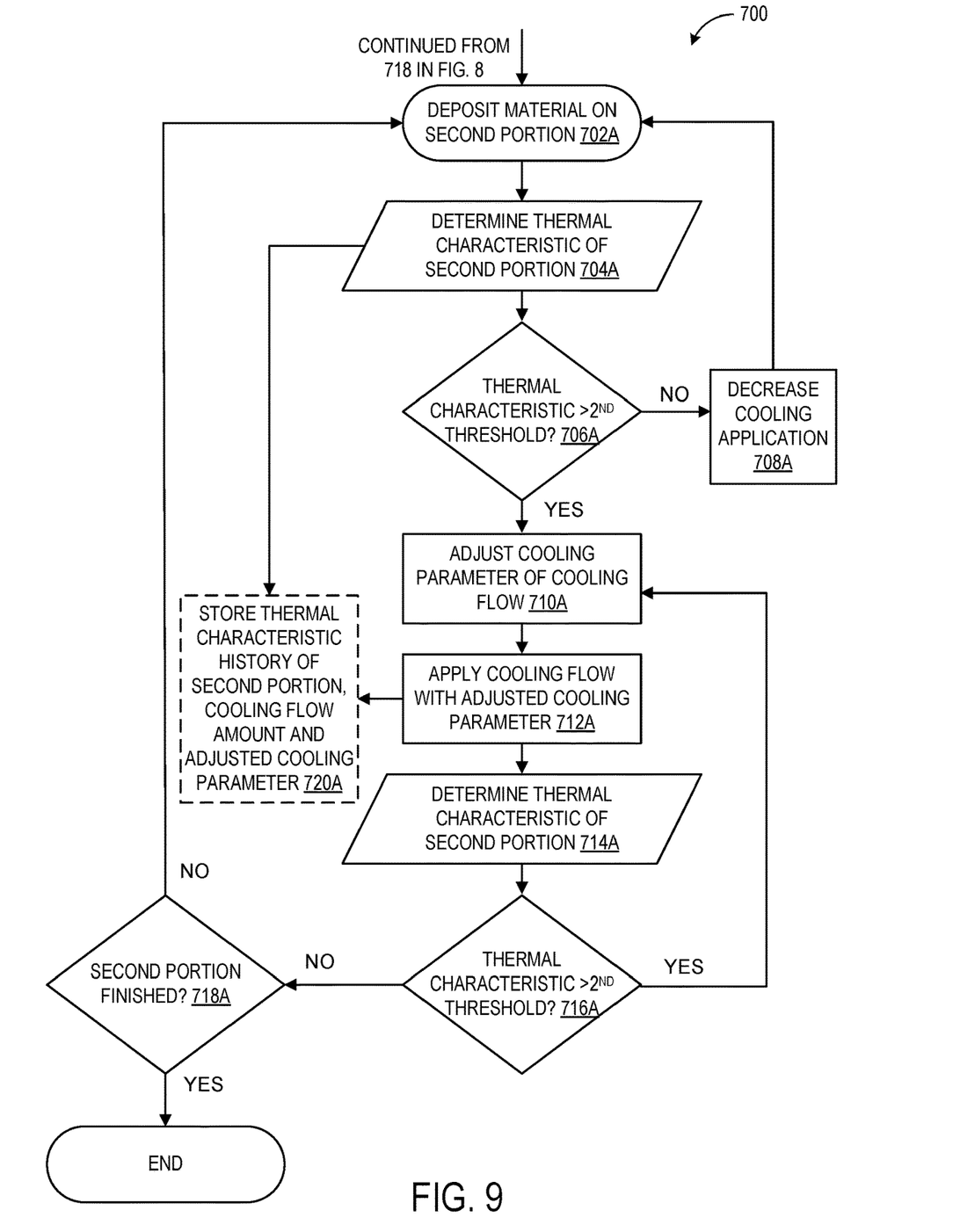
FIG. 9 shows an illustration of additional operations performed according to the method illustrated in FIG. 8.

FIG. 9 illustrates a flow chart of operations performed in continuation of the method 700 of FIG. 8. The following description of method 700 is provided with reference to the software and hardware components described above and shown in FIGS. 1-6. It will be appreciated that method 700 also may be performed in other contexts using other suitable hardware and software components. Method 700 continues from step 718 responsive to determining that thermal characteristic of at least the portion does not exceed the threshold associated with the portion.

At step 702A, method includes depositing material onto the substrate to form a shape of the workpiece in accordance with an AM process. The material may be the same or different from the material used in the operations of FIG. 8.

The deposition of material occurs at a second portion of the workpiece. At step 704A, the thermal characteristic is determined of the second portion of the workpiece. At step 720A, the determined thermal characteristic of the second portion of the workpiece may be stored in memory as part of a thermal history of the workpiece. The thermal characteristic may be continuously monitored during this determination. At step 706A, it is determined whether a thermal characteristic of the second portion exceeds a second threshold associated with the second portion, the second threshold configured to be different from the first threshold. In this embodiment, the portion, the threshold, and the cooling parameter discussed in relation to FIG. 8 are the first portion, the first threshold, and the first cooling parameter, respectively. At step 708A, responsive to determining that the thermal characteristic of at least the portion does not exceed a threshold associated with the portion, the cooling application is decreased or turned off. At step 702A, the deposition of material is continued.

At step 710A, responsive to determining that the thermal characteristic of the second portion exceeds the second threshold associated with the second portion, a second cooling parameter of a cooling flow to be applied to the workpiece is adjusted, the second cooling parameter configured to be different from the first cooling parameter. At step 712A, cooling flow is applied with the second cooling parameter to the second portion of the workpiece. At step 712A, the amount of cooling flow may also be tracked or measured. At step 714A, a thermal characteristic is again determined of the second portion of the workpiece. It will be appreciated that, when continuous monitoring is performed, the determination of the thermal characteristic may be continuously performed during all steps of the method 700. After the cooling flow is applied, the amount of cooling flow may be stored in memory at step 720A. The amount of cooling flow may be stored as a thermal history of the workpiece to inform the setting of cooling parameters in future manufacturing processes. The thermal history may include a time stamp and location stamp indicating when cooling flow was applied during the AM process, where the cooling flow was applied on the workpiece, and how much cooling flow was applied on the workpiece each time the cooling flow was applied. In addition, the thermal history may include a time stamp and location stamp indicating the thermal characteristic of the portion at each point in time of the AM process. The threshold of step 706A may be different from the threshold of step 716A, or the thresholds may be configured differently from each other.

At step 716A, it is determined whether the thermal characteristic of the second portion exceeds the second threshold associated with the second portion. Responsive to determining that thermal characteristic of the second portion exceeds the second threshold associated with the second portion, the method returns to step 710A to adjust the second cooling parameter of the cooling flow. At step 718A, responsive to determining that the thermal characteristic of the second portion does not exceed the second threshold associated with the second portion, it is determined whether the second portion is finished, or no further deposition of the second portion is necessary. When the determination is negative, the method 700 may continue to step 702A to continue the deposition of material at the second portion. When the determination is positive, the method 700 may terminate.

Although only a first portion 42 and a second portion 44 are depicted in the Figures, it will be appreciated that the thermal characteristics of a plurality of portions, or more than two portions, may be measured, each of the plurality of portions having a corresponding upper threshold, a corresponding lower threshold, and a corresponding threshold period of time. Subsequent to determining whether a thermal characteristic of a given portion of the plurality of portions exceeds the corresponding upper threshold associated with the given portion for the corresponding threshold period of time at which the corresponding upper threshold is exceeded, and responsive to determining that the thermal characteristic of the given portion exceeds the corresponding upper threshold associated with the given portion for the corresponding threshold period of time associated with the given portion, the deposition of material may be paused and coolant application increased to the given portion. Coolant may be applied until it is determined that the thermal characteristic of the given portion is lower than the corresponding lower threshold associated with the given portion. Coolant application may be decreased, and the deposition of material resumed responsive to determining that the thermal characteristic of the given portion is below the corresponding lower threshold associated with the given portion for the corresponding threshold period of time associated with the given portion.

Through active, in-process thermal cooling of AM components cooling rates, microstructure, mechanical properties, distortion, build geometry and stability can be further refined or controlled. The in-process cooling, in some applications, can inhibit a portion from becoming too hot and during processing. By controlling the cooling of an AM component, and the thermal profile subjected to the part during processing, the resultant microstructure can be altered to achieve desired mechanical properties. Establishing an in-process cooling method can have the potential benefit of balancing the effects from differences in thermal mass of a component geometry.

The systems and processes describe herein have the potential benefit of significantly reducing cycle times for AM components by eliminating stress relief or heat treatment processes typically required, allowing for tailored microstructures of AM components, increasing mechanical properties to desired needs.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. A method for use in additive manufacturing of a current workpiece that is three dimensional using an additive manufacturing system including a controller including a processor, deposition subsystem, and cooling subsystem, the method comprising:

determining, via a control program executed by the processor, a first threshold associated with a first portion of the current workpiece and a second threshold associated with a second portion of the current workpiece;

depositing material onto a substrate to form a shape of the current workpiece in accordance with an additive manufacturing process, via the additive manufacturing subsystem in response to deposition commands from the control program;

continuously monitoring a thermal characteristic of the first portion and the second portion of the current workpiece during the additive manufacturing process by measuring a surface temperature of the first portion and the second portion via a thermal sensor of the additive manufacturing system;

continuously determining, via the control program executed by the processor, whether the thermal characteristic of the first portion exceeds the first threshold and whether the thermal characteristic of the second portion exceeds the second threshold;

adjusting a cooling parameter of a cooling flow to be applied to the current workpiece responsive to a determination that the thermal characteristic of the first portion exceeds the first threshold or the thermal characteristic of the second portion exceeds the second threshold, via the control program executed by the processor; and intermittently or continuously applying the cooling flow with the adjusted cooling parameter to at least the first portion or second portion of the current workpiece that exceeds the first or second threshold, in response to cooling commands from the control program executed on the processor to the cooling subsystem, wherein the thermal characteristic is selected from the group consisting of time at temperature, peak temperature, and average temperature.

2. The method of claim 1, wherein
the cooling parameter is at least one of a coolant flow rate and a coolant temperature.

3. The method of claim 1, wherein
the surface temperature of the first portion or second portion is measured by at least one of a pyrometer, an infrared camera, and a thermometer.

4. The method of claim 1, wherein a coolant of the cooling flow is a liquid or a gas, and the material is a metal.

5. The method of claim 1, further comprising:
determining a subsequent value for the thermal characteristic at a later point in time;
determining that the subsequent value of the thermal characteristic is lower than the first or second threshold associated with the first portion or second portion; and
reducing the adjusted cooling parameter of the cooling flow applied to at least the first portion or second portion of the current workpiece responsive to determining that the subsequent value for the thermal characteristic is lower than the threshold.

6. An additive manufacturing system comprising:
an additive manufacturing deposition head;
a cooling applicator configured to apply coolant;
a processor operatively coupled to the deposition head and the cooling applicator; and
a memory storing instructions of a control program that, when executed by the processor, cause the system to:
determine, via the control program executed by the processor, a first threshold associated with a first portion of a current workpiece and a second threshold associated with a second portion of the current workpiece;
deposit material onto a substrate to form a shape of the current workpiece in accordance with an additive manufacturing process, via the additive manufacturing deposition head in response to deposition commands from the control program;
continuously monitor a thermal characteristic of the first portion and the second portion of the current workpiece during the additive manufacturing process by measuring a surface temperature of the first portion and the second portion via a thermal sensor of the additive manufacturing system;

continuously determine, via the control program executed by the processor, whether the thermal characteristic of the first portion exceeds the first and whether the thermal characteristic of the second portion exceeds the second threshold;

adjust a cooling parameter of a cooling flow to be applied to the current workpiece responsive to a determination that the thermal characteristic of the first portion exceeds the first threshold or the thermal characteristic of the second portion exceeds the second threshold, via the control program executed by the processor; and intermittently or continuously applying the cooling flow with the adjusted cooling parameter to at least the first portion or second portion of the current workpiece that exceeds the first or second threshold, in response to cooling commands from the control program executed on processor to the cooling applicator, wherein the thermal characteristic is selected from the group consisting of time at temperature, peak temperature, and average temperature.

7. The system of claim 6, wherein
the cooling parameter is at least one of a coolant flow rate and a coolant temperature.

8. The system of claim 6, wherein
the surface temperature of the first portion or second portion is measured by at least one of a pyrometer, an infrared camera, and a thermometer.

9. The system of claim 6, wherein the first or second threshold is determined based on a thermal history including a location stamp indicating where the cooling flow was applied on the current workpiece, and how much cooling flow was applied on the current workpiece each time the cooling flow was applied.

10. The system of claim 6, wherein the first or second threshold is determined based on a thermal history including a time stamp indicating when the cooling flow was applied.

11. The system of claim 6, wherein the first or second threshold is determined based on a thermal history including a time stamp and a location stamp indicating the thermal characteristic of the first or second portion at each point in time of the manufacturing process.

12. The method of claim 1, wherein the first or second threshold is determined based on a thermal history including a location stamp indicating where the cooling flow was applied on the current workpiece, and how much cooling flow was applied on the current workpiece each time the cooling flow was applied.

13. The method of claim 1, wherein the first or second threshold is determined based on a thermal history including a time stamp indicating when the cooling flow was applied.

14. The method of claim 1, wherein the first or second threshold is determined based on a thermal history including a time stamp and a location stamp indicating the thermal characteristic of the first or second portion at each point in time of the manufacturing process.

* * * * *

UNITED STATES PATENT AND TRADEMARK OFFICE
CERTIFICATE OF CORRECTION

| | | |
|---|---|---|
| PATENT NO. | : 12,275,192 B2 | Page 1 of 1 |
| APPLICATION NO. | : 16/421303 | |
| DATED | : April 15, 2025 | |
| INVENTOR(S) | : Andrew H. Baker et al. | |

It is certified that error appears in the above-identified patent and that said Letters Patent is hereby corrected as shown below:

In the Claims

In Column 16, Line 7, Claim 6 delete "the first" and insert -- the first threshold --

Signed and Sealed this
Twenty-third Day of September, 2025

John A. Squires
*Director of the United States Patent and Trademark Office*